United States Patent Office 3,505,332
Patented Apr. 7, 1970

3,505,332
CERTAIN 5-PHENYL-2,4,7-TRIAMINO-
PYRIDO[2,3-d]PYRIMIDINES
Bernard S. Hurlbert, Tarrytown, and George H. Hitchings,
Yonkers, N.Y., assignors to Burroughs Wellcome & Co.
(U.S.A.) Inc., Tuckahoe, N.Y., a corporation of New
York
No Drawing. Continuation-in-part of application Ser. No.
424,177, Jan. 8, 1965. This application June 19, 1968,
Ser. No. 738,135
Claims priority, application Great Britain, Feb. 18, 1965,
7,055/65, Patent 1,129,084
Int. Cl. C07d 57/70
U.S. Cl. 260—256.4                                6 Claims

ABSTRACT OF THE DISCLOSURE

This invention is directed to compounds which are useful as diuretics. The compounds are represented by the formula

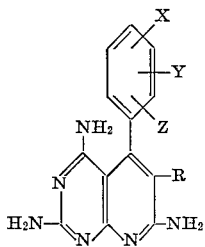

in which X, Y and Z are selected from the class consisting of halogen, hydrogen, amino, lower alkyl substituted amino, lower alkoxyl, lower alkyl and nitro, and in which R is selected from the class consisting of lower alkyl and hydrogen.

---

This application is a continuation-in-part of U.S. patent applications Ser. No. 424,177 filed Jan. 8, 1965, and Ser. No. 518,544 filed Jan. 4, 1966, both now abandoned, and Ser. No. 684,940 filed Nov. 22, 1967, which has been allowed.

The present invention relates to a novel group of diuretic triaminopyridopyrimidines and to the method for their preparation.

In U.S. patent application Ser. No. 424,177, of which the present case is a continuation-in-part, there is disclosed a new and improved method of producing in a state of purity, various 2,4-diamino-7-chloropyrido(2,3-d)pyrimidines, (I). In this formula, a number of alkyl and aryl substitutions may be present at the 5 and 6 positions. In the same application, it is also shown that these 7-chloro derivatives are cleanly convertible by reaction with ammonia and amines to 7-amino derivatives.

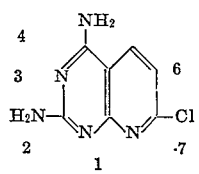

It has now been found that certain of these 2,4,7-triaminopyrido(2,3-d)pyrimidines, shown in Formula II, have exemplary activity as diuretics. In Formula II, R is methyl, ethyl, propyl or hydrogen, and X, Y and Z are selected from the class consisting of lower alkyl, amino, lower alkyl substituted amino (methyl, ethyl, propyl, etc.), lower alkoxyl, nitro, hydrogen and halogen.

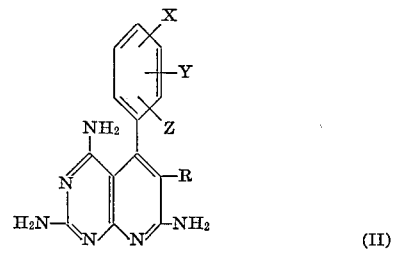

These diuretics are characterized by water and natriuresis with conservation of potassium ion, i.e. urinary excretion with a high Na+/K+ ratio is produced by the action of these compounds. In rats and dogs, the compounds were effective in the dosage range of 3.75 to 25 mg./kg. and maintained effectiveness when daily doses of this order were given for 29 days.

The synthesis of the compounds of this invention follows the route below:

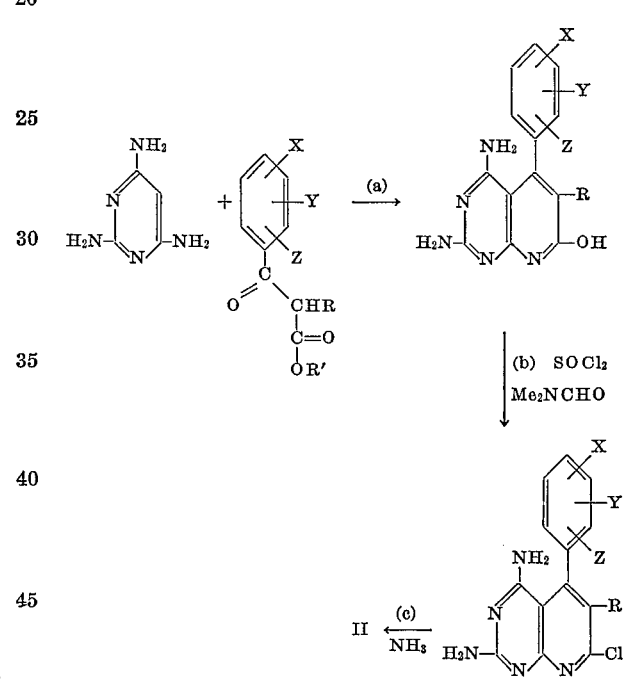

In the foregoing route, R' is a lower alkyl group, preferably methyl or ethyl. Since the corresponding alcohol is eliminated in step a, the precise nature of R' is not critical. Step a is conducted at around or above 200° using an inert solvent such as diphenyl ether. Alternatively, excess reactant ester may also serve as solvent. Step b is described in our U.S. application 424,177 as is Step c. This latter is accomplished by heating the 7-chloro intermediate in a pressure vessel with a solution of ammonia in a lower alcohol, conveniently ethanol.

EXAMPLE 1

2,4-diamino-7-hydroxy-6-methyl-5-phenylpyrido
(2,3-d)pyrimidine

A mixture of 174 g. of ethyl α-benzoylpropionate and 106 g. of 2,4,6-triaminopyrimidine in 900 ml. of phenyl ether was heated with stirring at 215–220° C. for 0.5 hour while low-boiling material was allowed to distill. The mixture was then cooled to room temperature and 300 ml. of methanol added. This mixture was filtered and the precipitate washed with methanol. The precipitate was then stirred with 2 liters of boiling water, refiltered and washed with hot methanol. On drying, 115 g.

of 2,4-diamino-7-hydroxy-6-methyl - 5 - phenylpyrido-(2,3-d)pyrimidine was obtained.

EXAMPLE 2

2,4-diamino-7-chloro-6-methyl-5-phenylpyrido (2,3-d)pyrimidine 57 grams of the above 7-hydroxy compound was placed in 400 ml. of chloroform and 146 g. of N,N-dimethylformamide was added. To this mixture was added, with stirring, 119 g. of thionyl chloride while keeping the temperature of the mixture below 15° C. Then the mixture was heated at reflux, with stirring, for 1.5 hours. The resulting solution was concentrated in vacuo at 50° to a thick syrup. The syrup was dissolved in 200 ml. of absolute ethanol and this solution was made basic by the slow addition, with vigorous stirring, of concentrated aqueous ammonia. The resulting mixture was held at 10° C. for 18 hours and then filtered. The precipitate was stirred for one hour with 400 ml. of 2 N sodium hydroxide solution, filtered and washed with water. On drying, 44.5 g. of 2,4-diamino-7-chloro-6-methyl-5-phenylpyrido(2,3-d)pyrimidine was obtained.

EXAMPLE 3

2,4,7-triamino-6-methyl-5-phenylpyrido(2,3-d) pyrimidine

A solution of anhydrous ethanol saturated with ammonia at 5° C. was prepared. A mixture of 100 ml. of this ammonia-ethanol solution and 20 g. of the above 7-chloro compound was heated in a steel bomb for 18 hours at 160° C. The bomb was then cooled and the contents filtered. The precipitate was dissolved in 400 ml. of boiling 75 percent aqueous ethanol made acidic with 2 N hydrochloric acid, the solution treated with charcoal, filtered while hot, and cooled. The precipitate so formed was filtered and dried to give 19 g. of 2,4,7-triamino-6-methyl - 5 - phenylpyrido(2,3-d)pyrimidine hydrochloride hydrate.

EXAMPLE 4

2,4-diamino-7-hydroxy-5-phenylpyrido(2,3-d)pyrimidine

By the method described in Example 1, 52.2 g. (39 percent) of 2,4-diamino-7-hydroxy-5-phenylpyrido(2,3-d) pyrimidine hydrate was obtained from 96.1 g. (0.5 mole) of ethyl benzoyl-acetate and 62.5 g. (0.5 mole) of 2,4,6-triaminopyrimidine in 400 ml. of diphenyl ether. Found: $N=26.80$ percent; $C_{13}H_{11}N_5O \cdot H_2O$ requires $N=26.71$ percent.

EXAMPLE 5

2,4-diamino-7-chloro-5-phenylpyrido(2,3-d)pyrimidine

By the method described in Example 2, 21.9 g. of 2,4-diamino-7-chloro-5-phenylpyrido(2,3-d)pyrimidine was obtained from 25.3 g. (0.1 mole) of 2,4-diamino-7-hydroxy-5-phenylpyrido(2,3-d)pyrimidine, 73.0 g. (1.0 mole) of N,N-dimethylformamide and 119 g. (1.0 mole) of thionyl chloride in 200 ml. of chloroform. This product was not recrystallized.

EXAMPLE 6

2,4,7-triamino-5-phenylpyrido(2,3-d)pyrimidine

By the method described in Example 4, 10.0 g. of 2,4-diamino-7-chloro-5-phenylpyrido(2,3-d)pyrimidine gave, after recrystallization of the product from aqueous ethanol which was acidified with hydrochloric acid, 2.46 g. (22 percent) of 2,4,7-triamino-5-phenylpyrido(2,3-d)pyrimidine hydrochloride hydrate, melting at 316–7° C. (uncorrected). Found: $C=51.17$; $H=5.13$; $N=27.15$ percent; $C_{13}H_{12}N_6 \cdot HCl \cdot H_2O$ requires $C=50.90$; $H=4.93$; $N=27.40$ percent.

EXAMPLE 7

2,4,7-triamino-6-ethyl-5-phenylpyrido(2,3-d)pyrimidine

By the method described in Example 3, 13.2 g. of 2,4,7-triamino-6-ethyl-5-phenylpyrido(2,3-d) hydrochloride hydrate was obtained from 20.0 g. of 2,4-diamino-7-chloro-6-ethyl-5-phenylpyrido(2,3-d)pyrimidine.

EXAMPLE 8

2,4,7-triamino-6-methyl-5-(p-methylphenyl)pyrido (2,3-d)pyrimidine

By the method described in Example 3, 13.2 g. of 2,4,7-triamino-6-methyl-5-(p-methylphenyl)pyrido(2,3 - pyrimidine hydrochloride hemihydrate was obtained from 20 g. of 2,4-diamino-7-chloro - 6 - methyl-5-(p-methylphenyl) pyrido(2,3-pyrimidine.

EXAMPLE 9

2,4,7-triamino-5-(p-methovyphenyl)-6-methylpyrido (2,3-d)pyrimidine

By the method described in Example 3, 13.1 g. of 2,4,7-triamino-5-(p - methoxyphenyl) - 6 - methylpyrido(2,3-d) pyrimidine hydrochloride hydrate was obtained from 20 g. of 2,4-diamino-7-chloro-5-(p - methoxyphenyl)-6-methylpyrido(2,3-d)pyrimidine.

EXAMPLE 10

2,4,7-triamino-5-(3,4-dichlorophenyl)-6-methylpyrido (2,3-d)pyrimidine

By the method described in Example 3, 13.7 g. of 2,4,7-triamino-5-(3,4-dichlorophenyl)-6-methylpyrido(2,3-pyrimidine hydrochloride hydrate was obtained from 20 g. of 2,4-diamino-7-chloro-5-(3,4-dichlorophenyl)-6-methylpyrido(2,3-d)pyrimidine.

EXAMPLE 11

2,4,7-triamino-5-(o-chlorophenyl)-6-methylpyrido (2,3-d)pyrimidine

By the method described in Example 3, 13.0 g. of 2,4,7-triamino-5-(o - chlorophenyl)-6-methylpyrido(2,3-d)pyridine hydrochloride hydrate was obtained from 23.9 g. of 2,4-diamino-7-chloro-5-(o - chlorophenyl) - 6 - methylpyrido(2,3-d)pyrimidine.

EXAMPLE 12

2,4,7-triamino-5-(p-chlorophenyl)-6-methylpyrido (2,3-d)pyrimidine

By the method described in Example 3, 14.47 g. of 2,4,7-triamino-5-(p-chlorophenyl)-6-methylpyrido(2, 3-d) pyrimidine hydrochloride hydrate was obtained from 20.0 g. of 2,4-diamino-7-chloro-5-(p-chlorophenyl)-6-methylpyrido(2,3-d)pyrimidine.

EXAMPLE 13

6-methyl-5-(p-nitrophenyl) 2,4,7-triaminopyrido [2,3-d]-pyrimidine 3.21 g. of 6-methyl-5-phenyl-2,4,7-triaminopyrido[2,3-d]-pyrimidine (see Example 3) was dissolved in 50 ml. of conc. $H_2SO_4$ and 1.01 g. of powdered $KNO_3$ was added with stirring at room temperature. The reaction mixture was then heated on a steam bath for 24 hr., cooled and poured into a mixture of 200 ml. of ethanol and 200 ml. of ice. This mixture was made basic by NaOH and the precipitate filtered and washed with $H_2O$. The precipitate was recrystallized from 50% ethanol, $H_2O$ which had been made acid by addition of $H_2SO_4$. 2.74 g. of 6-methyl-5-(p - nitrophenyl)-2,4,7-triaminopyrido[2,3-d]pyrimidine sulfate was obtained.

EXAMPLE 14–26

The following 2,4,7-triaminopyrido[2,3-d]pyrimidines of the formula III were prepared from the appropriate 7-oxo compounds by the methods given in Examples 1–3 herein, as well as the methods disclosed in the applications of which this application is a continuation-in-part.

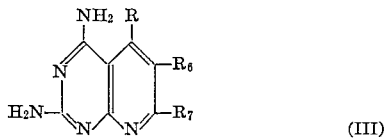

(III)

| $R_5$ | $R_6$ | $R_7$ | Salt | M.P., °C |
|---|---|---|---|---|
| (14) p-$C_6H_4NO_2$ | $CH_3$ | $NH_2$ | $H_2SO_4$ | 275 |
| (15) o-$C_6H_4OCH_3$ | $CH_3$ | $NH_2$ | $HCl.H_2O$ | 259-60 |
| (16) p-$C_6H_4CH(CH_3)_2$ | $CH_3$ | $NH_2$ | $HCl.H_2O$ | >320 |
| (17) p-$C_6H_4F$ | $CH_3$ | $NH_2$ | $HCl.3/2H_2O$ | >300 |
| (18) m-$C_6H_4Br$ | $CH_3$ | $NH_2$ | $HCl.H_2O$ | >300 |
| (19) 3,4-$C_6H_3(OCH_3)_2$ | $CH_3$ | $NH_2$ | $HCl$ | >300 |
| (20) p-$C_6H_4I$ | $CH_3$ | $NH_2$ | $HCl.1/2H_2O$ | >300 |
| (21) m-$C_6H_4OCH_3$ | $CH_3$ | $NH_2$ | $HCl.3/4H_2O$ | 291-2 |
| (22) p-$C_6H_4N(CH_3)_2$ | $CH_3$ | $NH_2$ | $HCl.H_2O$ | >320 |
| (23) m-$C_6H_4Cl$ | $CH_3$ | $NH_2$ | $HCl.H_2O$ | |
| (24) p-$C_6H_4Br$ | $CH_3$ | $NH_2$ | $HCl.H_2O$ | |
| (25) o-$C_6H_4CH_3$ | $CH_3$ | $NH_2$ | $HCl.H_2O$ | 355 |
| (26) p-$C_6H_4NH_2$ | $CH_3$ | $NH_2$ | | |

The compound of Example 26 may be made using conventional reduction techniques, using the compound of Example 14 as the starting material.

What is claimed is:

1. A compound represented by the formula

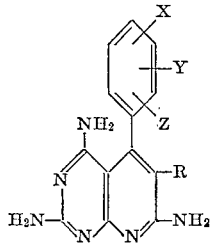

wherein X, Y and Z are selected from the class consisting of halogen, hydrogen, lower alkyl substituted amino, amino, lower alkoxy, lower alkyl and nitro, and wherein R is selected from the class consisting of lower alkyl and hydrogen.

2. A compound according to claim 1, wherein R is selected from the class consisting of methyl and ethyl.

3. A compound according to claim 1, wherein X, Y and Z are hydrogen and R is methyl.

4. A compound according to claim 1, wherein Y and Z are hydrogen and X is p-methoxy.

5. A compound according to claim 1, in which Y and Z are hydrogen and X is selected from the class consisting of amino and lower alkyl substituted amino.

6. A compound represented by the formula

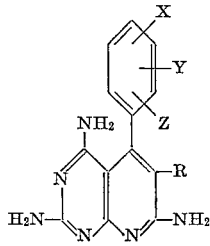

wherein R is selected from the class consisting of methyl, ethyl and hydrogen, and X, Y and Z are selected from the class consisting of chloro, methyl, methoxyl and hydrogen.

References Cited
FOREIGN PATENTS
1,129,084  10/1968  Great Britain.

NICHOLAS S. RIZZO, Primary Examiner

R. J. GALLAGHER, Assistant Examiner

U.S Cl. X.R.
424—251